United States Patent
Xu et al.

(10) Patent No.: US 10,390,026 B2
(45) Date of Patent: Aug. 20, 2019

(54) SMART REORDERING IN RECURSIVE BLOCK PARTITIONING FOR ADVANCED INTRA PREDICTION IN VIDEO CODING

(71) Applicant: GOOGLE LLC, Mountain View, CA (US)

(72) Inventors: Yaowu Xu, Saratoga, CA (US); James Bankoski, Los Gatos, CA (US); Paul Wilkins, Cambridge (GB); Hui Su, College Park, MD (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 15/081,082

(22) Filed: Mar. 25, 2016

(65) Prior Publication Data

US 2017/0280143 A1   Sep. 28, 2017

(51) Int. Cl.
*H04N 19/174* (2014.01)
*H04N 19/159* (2014.01)
(Continued)

(52) U.S. Cl.
CPC ......... *H04N 19/174* (2014.11); *H04N 19/103* (2014.11); *H04N 19/129* (2014.11);
(Continued)

(58) Field of Classification Search
None
See application file for complete search history.

(56) References Cited

U.S. PATENT DOCUMENTS

| 9,350,988 B1 | 5/2016 | Bankoski et al. |
| 2004/0233989 A1* | 11/2004 | Kobayashi ........... H04N 19/105 375/240.16 |

(Continued)

FOREIGN PATENT DOCUMENTS

| EP | 1696673 A1 | 8/2006 |
| WO | 2015058397 A1 | 4/2015 |

OTHER PUBLICATIONS

Sullivan et al., "Overview of the High Efficiency Video Coding (HEVC) Standard", IEEE trasactions on circuits and systems for video technology, vol. 22, No. 12, Dec. 2012, pp. 1649-1668.

(Continued)

*Primary Examiner* — William C Vaughn, Jr.
*Assistant Examiner* — Stuart D Bennett
(74) *Attorney, Agent, or Firm* — Young Basile Hanlon & MacFarlane, P.C.

(57) ABSTRACT

Video data streams can be encoded and decoded using inter or intra prediction. The blocks of a frame can be processed based on depth, from the lowest level sub-blocks to the highest level large blocks, and divided into groups of blocks to be inter predicted, blocks having sub-blocks that are to be inter predicted and sub-blocks that are to be intra predicted, and blocks to be intra predicted, and the blocks to be inter predicted are encoded first, the blocks having sub-blocks to be inter predicted and intra predicted encoded second, and the blocks to be intra predicted encoded last. The availability of data from the inter predicted blocks can improve the performance of intra prediction over processing the blocks in the scan order since more pixel data is available for intra prediction of some blocks.

19 Claims, 8 Drawing Sheets

(51) Int. Cl.
*H04N 19/129* (2014.01)
*H04N 19/593* (2014.01)
*H04N 19/103* (2014.01)
*H04N 19/44* (2014.01)
*H04N 19/503* (2014.01)
*H04N 19/65* (2014.01)
*H04N 19/88* (2014.01)
*H04N 19/91* (2014.01)
*H04N 19/192* (2014.01)

(52) U.S. Cl.
CPC ........... *H04N 19/159* (2014.11); *H04N 19/44* (2014.11); *H04N 19/503* (2014.11); *H04N 19/593* (2014.11); *H04N 19/65* (2014.11); *H04N 19/88* (2014.11); *H04N 19/91* (2014.11); *H04N 19/192* (2014.11)

(56) References Cited

U.S. PATENT DOCUMENTS

| | | | |
|---|---|---|---|
| 2012/0082212 A1* | 4/2012 | Sadafale | G06F 17/147 375/240.2 |
| 2012/0128070 A1 | 5/2012 | Kim et al. | |
| 2013/0064292 A1 | 3/2013 | Song et al. | |
| 2014/0307787 A1* | 10/2014 | Zheng | H04N 19/597 375/240.12 |
| 2015/0261884 A1 | 9/2015 | Pang et al. | |
| 2015/0319463 A1* | 11/2015 | Sekiguchi | H04N 19/159 375/240.12 |

OTHER PUBLICATIONS

Zheng et al., "Adaptive Block Coding Order for Intra Prediction in HEVC", IEEE Transactions on Circuits and Systems for Video Technology, vol. 26, No. 11, Nov. 1, 2016, pp. 2152-2158.
Mukherjee et al., "The latest open-source video codec VP9—An overview and preliminary results", 2013 Picture Coding Symposium, IEEE, Dec. 8, 2013, pp. 390-393.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and ecoding Guide, WebM Project", Google On2, Dec. 1, 2010, 103 pp.

* cited by examiner

SMART REORDERING IN RECURSIVE BLOCK PARTITIONING FOR ADVANCED INTRA PREDICTION IN VIDEO CODING

TECHNICAL FIELD

This disclosure relates to video encoding and decoding.

BACKGROUND

Digital video can be used for various applications, including, for example, video conferencing, high definition video entertainment, video advertisements, or sharing of user-generated videos. Digital video streams may represent video using a sequence of frames or still images. Each frame can include a number of blocks, which in turn may contain information describing the value of color, brightness or other attributes for pixels. A digital video stream can contain a large amount of data and consume a significant amount of computing or communications resources of a computing device for processing, transmitting or storing of the video data. Various approaches have been proposed to reduce the amount of data in video streams, including compression and other encoding techniques.

SUMMARY

This disclosure relates generally to encoding and decoding video data. One implementation of a method for encoding a video stream includes identifying, in a frame of the video stream, a plurality of blocks, identifying, in the frame, a first group of blocks, from the plurality of blocks, to be encoded using inter prediction, identifying, in the frame, a second group of blocks comprising blocks, from the plurality of blocks, wherein each block comprises a plurality of sub-blocks having at least one sub-block to be encoded using inter prediction and at least one sub-block to be encoded using intra prediction, and identifying, in the frame, a third group of blocks, from the plurality of blocks, to be encoded using intra prediction. The method also includes at least partially encoding, using inter prediction, the first group of blocks to form a first group of encoded blocks, at least partially decoding, using a processor, the first group of encoded blocks to form a first group of decoded blocks, at least partially encoding, using inter prediction, at least one blocks from the second group of blocks to form a second group of inter predicted encoded blocks, wherein the at least one block from the second group of blocks was to be encoded using inter prediction, at least partially decoding, using the processor, the second group of inter predicted encoded blocks to form a second group of inter predicted decoded blocks, encoding, using intra prediction, at least one blocks from the second group of blocks using at least one block of the first group of decoded blocks or at least one block from the second group of inter predicted decoded blocks to form a second group of intra predicted encoded blocks, wherein the at least one block from the second group of blocks was to be encoded using intra prediction, encoding, using intra prediction, the third group of blocks using at least one block from the first group of decoded blocks or at least one block from the second group of inter predicted decoded blocks to form a third group of encoded blocks, and inserting the first group of encoded blocks, the second group of inter predicted encoded blocks, the second group of intra predicted encoded blocks, and the third group of encoded blocks into an encoded bitstream.

One implementation of a method for decoding a video bitstream includes identifying, in a frame in the video stream, a first group of encoded blocks that were encoded using inter prediction, identifying, in the frame, a second group of encoded blocks comprising blocks wherein each block comprises a plurality of sub-blocks having at least one sub-block that was encoded using inter prediction and at least one sub-blocks that was encoded using intra prediction, and identifying, in the frame, a third group of encoded blocks that were encoded using intra prediction. The method also includes decoding, using a processor performing inter prediction, the first group of encoded blocks to form a first group of decoded blocks, decoding, using the processor performing inter prediction, at least one block from the second group of encoded blocks to form a second group of inter predicted decoded blocks, wherein the at least one block from the second group of encoded blocks was encoded using inter prediction, decoding, using intra prediction, at least one block from the second group of encoded blocks using at least one block from the first group of decoded blocks or at least one block from the second group of inter predicted decoded blocks to form a second group of intra predicted decoded blocks, wherein the at least one block from the second group of encoded blocks was encoded using intra prediction, and decoding, using intra prediction, the third group of encoded blocks using at least one block from the first group of decoded blocks or at least one block from the second group of inter predicted decoded blocks to form a third group of decoded blocks.

Another implementation of the teachings herein is an apparatus for encoding a video stream, including a memory and a processor. The processor is configured to execute instructions in memory to identify, in a frame of the video stream, a plurality of blocks, identify, in the frame, a first group of blocks, from the plurality of blocks, to be encoded using inter prediction, identify, in the frame, a second group of blocks comprising blocks, from the plurality of blocks, wherein each block comprises a plurality of sub-blocks having at least one sub-block that is to be encoded using inter prediction and at least one sub-block that is to be encoded using intra prediction, and identify, in the frame, a third group of blocks, from the plurality of blocks, to be encoded using intra prediction. The processor is also configured to at least partially encode, using inter prediction, the first group of blocks to form a first group of encoded blocks, at least partially decode the first group of encoded blocks to form a first group of decoded blocks, at least partially encode, using inter prediction, at least one block from the second group of blocks to form a second group of inter predicted encoded blocks, wherein the at least one block from the second group of blocks was to be encoded using inter prediction, at least partially decode the second group of inter predicted encoded blocks to form a second group of inter predicted decoded blocks, encode, using intra prediction, at least one block from the second group of blocks using at least one block from the first group of decoded blocks or at least one block from the second group of inter predicted decoded blocks to form a second group of intra predicted encoded blocks, wherein the at least one block from the second group of blocks was to be encoded using intra prediction, encode, using intra prediction, the third group of blocks using at least one block from the first group of decoded blocks or at least one block from the second group of inter predicted decoded blocks to form a third group of encoded blocks, and insert the first group of encoded blocks, the second group of inter predicted encoded blocks, the second group of intra predicted encoded blocks, and the third group of encoded blocks into an encoded bitstream.

Variations in these and other aspects and implementations will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
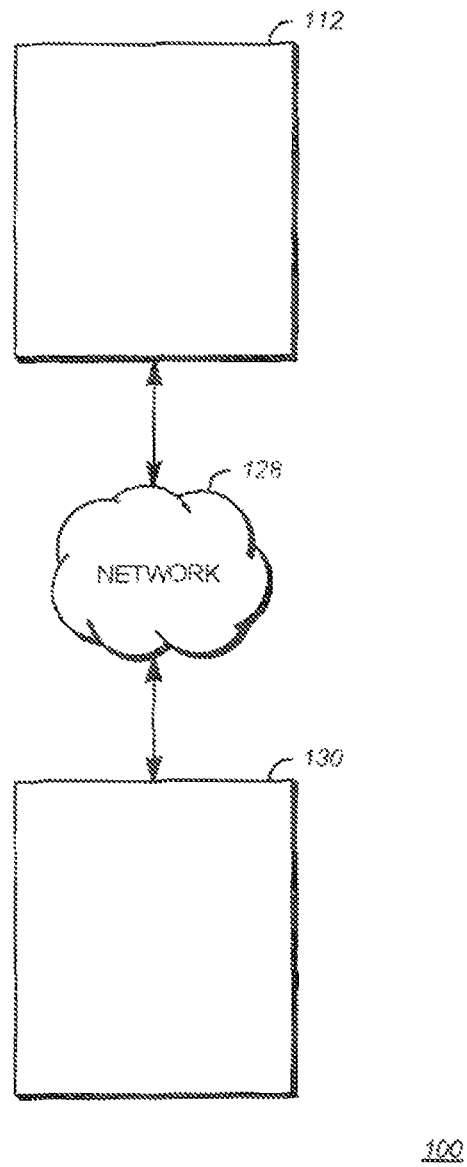
FIG. 1 is a schematic of a video encoding and decoding system.

Digital video is used for various purposes including, for example, remote business meetings via video conferencing, high definition video entertainment, video advertisements, and sharing of user-generated videos. Image and video compression can improve the efficiency of data transmission and storage of digital video. Compression techniques can be used to reduce the amount of information to be transmitted or stored. Internet based multimedia services such as streaming video web sites can rely on good compression technology to improve the quality of service and control the cost of bandwidth and content delivering at the same time.

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in a previously encoded frame in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter prediction.

In video compression, a block-based encoder-decoder system (codec) can first divide an image frame into blocks. The encoder can scan (e.g., in raster scan order) the blocks in the frame and pick the best prediction mode for each block based on previously-processed blocks. The encoder can subtract the predicted block from the block and encode the prediction residual. Aspects of this disclosure describe a new coding scheme that performs an extra pass through the blocks before prediction coding so as to re-order the encoding and decoding of blocks based on the prediction modes used. By such re-ordering, the encoder effectively changes the data dependency of the blocks in the encoding and decoding process, allowing the blocks encoded later in a frame to use all reconstructed pixel information from previously encoded blocks, improving the quality of intra prediction and the overall coding efficiency. A decoder can perform the same re-ordering of blocks for decoding, relying on bits included in the encoded video bitstream to indicate which blocks can be decoded using inter prediction and which blocks can be decoded using intra prediction.

Grouping blocks in to three groups for encoding or decoding can permit the use of intra prediction modes where pixel data from more than two sides of a block can be used to form a prediction block. In some intra prediction modes, such as where blocks of a frame are processed in raster scan order, intra prediction modes are limited to modes using pixel data from blocks occurring before the block to be predicted in the raster scan order. Identifying blocks to be encoded or decoded using inter prediction and at least partially encoding these blocks first permits the use of pixel data from blocks on all four sides of a block to be used in prediction in some cases, thereby improving the performance of the encoding or decoding process.

First discussed below are environments in which aspects of this disclosure can be implemented.

FIG. 1 is a schematic of a video encoding and decoding system 100 in which aspects of this disclosure can be implemented. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect the transmitting station 112 and a receiving station 130 for encoding and decoding of a video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
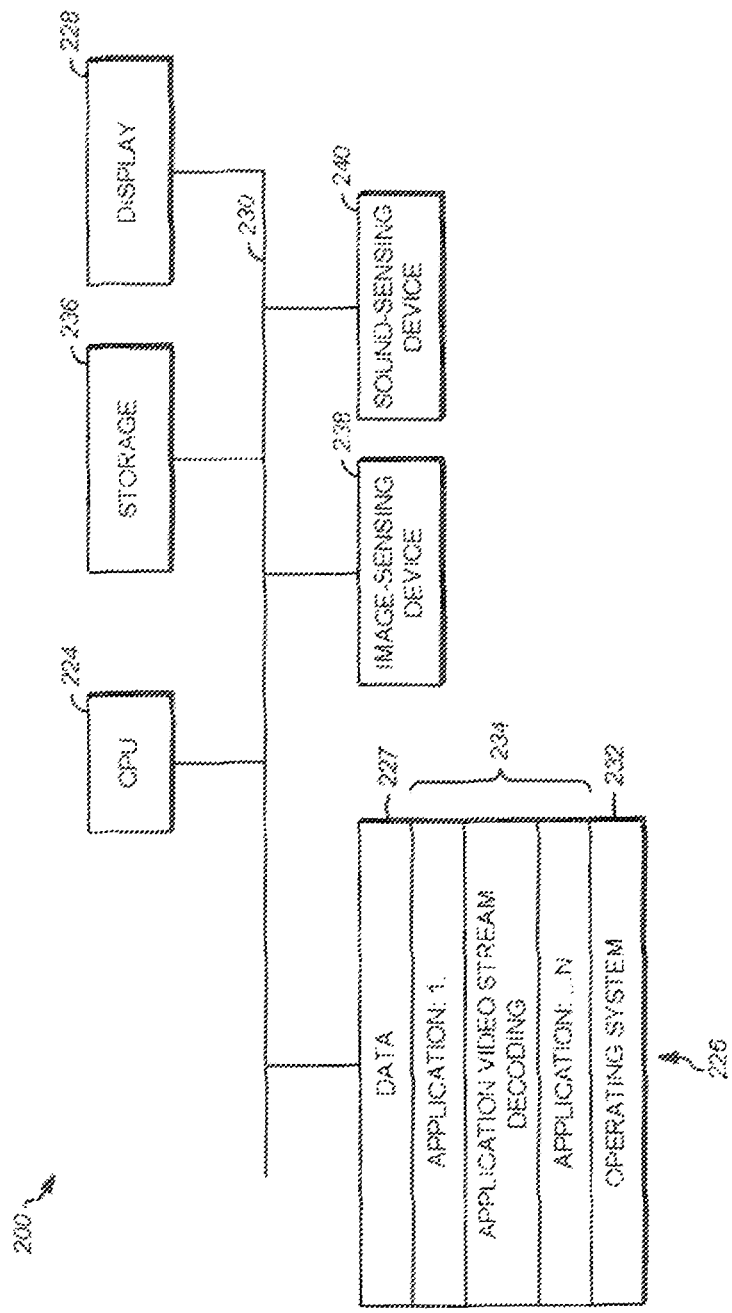
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, one implementation can omit network 128 and/or display 228. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol. In yet another implementation, additional components can be added to the encoder and decoder system 100. For example, a display or a video camera can be attached to transmitting station 112 to capture the video stream to be encoded.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as the memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. As shown, for example, application programs 234 can include applications 1 through N, which further include a video stream decoding application that performs a method described here. Computing device 200 can also include a secondary storage 236 that can be, for example, a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230 and can be configured to display a rendering of the video stream decoded in receiving station 130. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
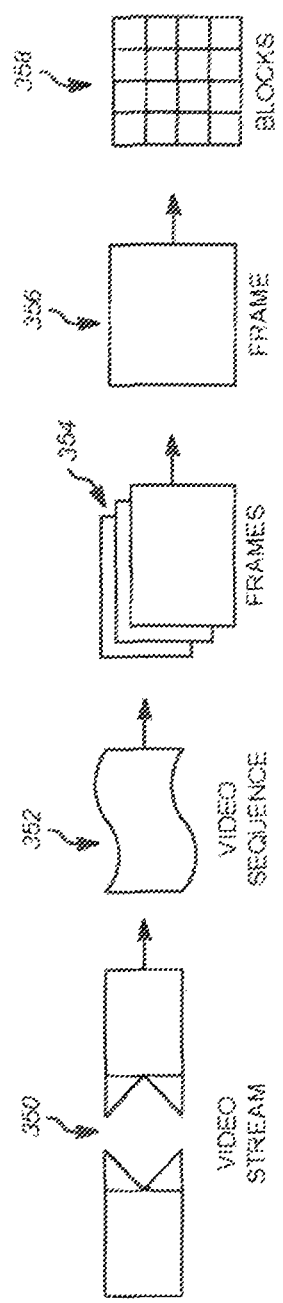
FIG. 3 is a diagram of a typical video stream to be encoded and subsequently decoded.

FIG. 3 is a diagram of an example of a video stream 350 to be encoded and decoded. Video stream 350 (also referred to herein as video data) includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. Each frame 356 can capture a scene with one or more objects, such as people, background elements, graphics, text, a black wall, or any other information.

At the next level, single frame 356 can be divided into a set of blocks 358, which can contain data corresponding to, in some of the examples described below, a 8×8 pixel group in frame 356. Blocks 358 can also be of any other suitable size such as 16×8 pixel groups, 8×16 pixel groups, 16×16 pixel groups, 4×4 pixels, or of any other size, and can be further subdivided into smaller blocks depending on the application. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof. The blocks 358 can also be arranged in planes of data. For example, a corresponding block 358 in each plane can respectively contain luminance and chrominance data for the pixels of the block 358.

Figure 4:
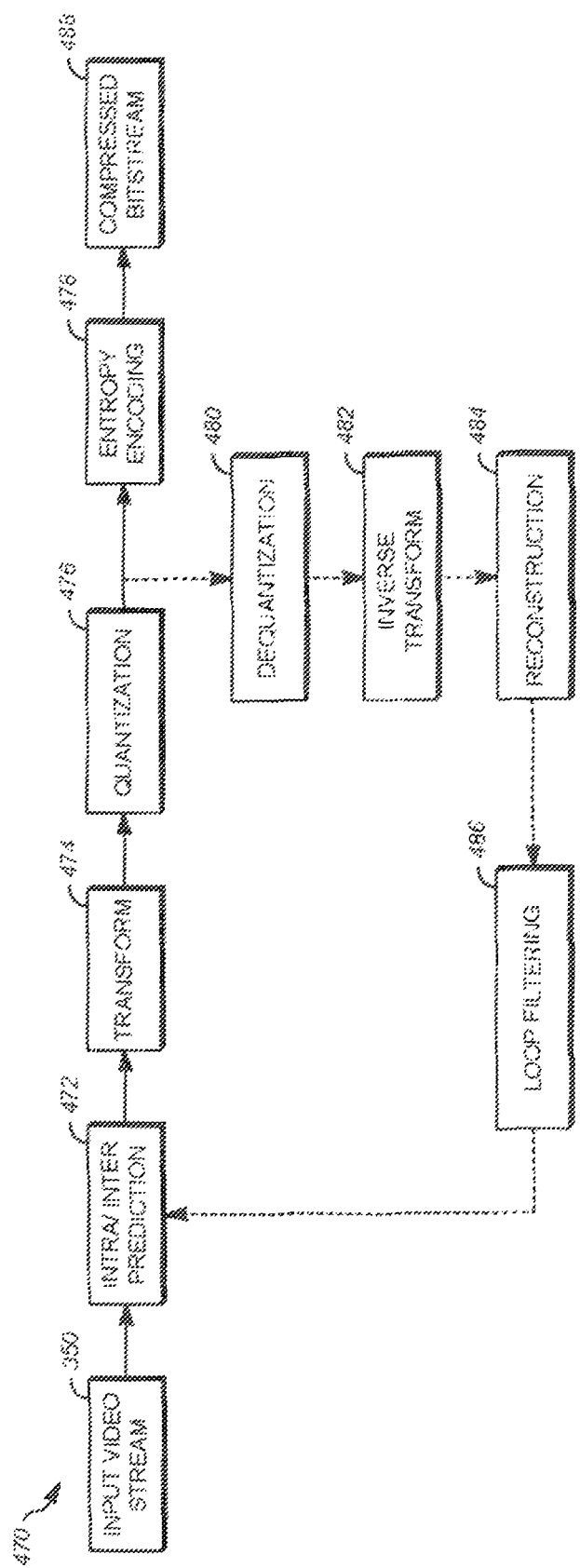
FIG. 4 is a block diagram of a video compression system in accordance with an aspect of this disclosure.

FIG. 4 is a block diagram of an encoder 470 in accordance with implementations of this disclosure. Encoder 470 can be implemented, as described above, in transmitting station 112 such as by providing a computer software program stored in memory 226, for example. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in a reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 within the video stream 350 can be processed in units of blocks 358. At the intra/inter prediction stage 472, each block can be encoded using intra-frame prediction (i.e., within a single frame) or inter-frame prediction (i.e., from frame to frame). In either case, a prediction block can be formed. The prediction block is then subtracted from the block to produce a residual block (also referred to herein as residual).

Intra-frame prediction (also referred to herein as intra prediction) and inter-frame prediction (also referred to herein as inter prediction) are techniques used in modern image/video compression schemes. In the case of intra-frame prediction, a prediction block can be formed from spatially nearby blocks in the current frame that have been previously encoded and reconstructed. In the case of inter-frame prediction, a prediction block can be formed from one or more blocks of previously-constructed reference frame(s), such as the last frame (i.e., the adjacent frame immediately before the current frame), the golden frame or the constructed or alternate frame described above.

The prediction block is then subtracted from the current block. The difference, or residual, is then encoded and transmitted to decoders. Image or video codecs may support many different intra and inter prediction modes; each block may use one of the prediction modes to obtain a prediction block that is most similar to the block to minimize the information to be encoded in the residual so as to re-create the block. The prediction mode for each block of transform coefficients can also be encoded and transmitted so a decoder can use the same prediction mode(s) to form prediction blocks in the decoding and reconstruction process.

Next, still referring to FIG. 4, the prediction block can be subtracted from the current block at intra/inter prediction stage 472 to produce a residual block (also called a residual). Transform stage 474 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), the Singular Value Decomposition Transform (SVD)m and the Asymmetric Discrete Sine Transform (ADST). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which can include for example the type of prediction used, motion vectors and quantization value, are then output to compressed bitstream 488. Compressed bitstream 488 can be formatted using various techniques, such as variable length coding (VLC) or arithmetic coding. Compressed bitstream 488 can also be referred to as an encoded video stream and the terms are used interchangeably herein.

The reconstruction path in FIG. 4 (shown by the dotted connection lines) can be used to provide both encoder 470 and a decoder 500 (described below) with the same reference frames to decode compressed bitstream 488. The reconstruction path performs functions that are similar to functions that take place during the decoding process that are discussed in more detail below, including dequantizing the quantized transform coefficients at dequantization stage 480 to generate dequantized transform coefficients and inverse transforming the dequantized transform coefficients at inverse transform stage 482 to produce a derivative residual block (i.e., derivative residual). At reconstruction stage 484, the prediction block that was predicted at the intra/inter prediction stage 472 can be added to the derivative residual to create a reconstructed block. In some implementations, loop filtering stage 486 can be applied to the reconstructed block to reduce distortion such as blocking artifacts.

Other variations of encoder 470 can be used to encode compressed bitstream 488. For example, a non-transform based encoder 470 can quantize the residual block directly without transform stage 474. In another implementation, an encoder 470 can have quantization stage 476 and dequantization stage 480 combined into a single stage.

Figure 5:
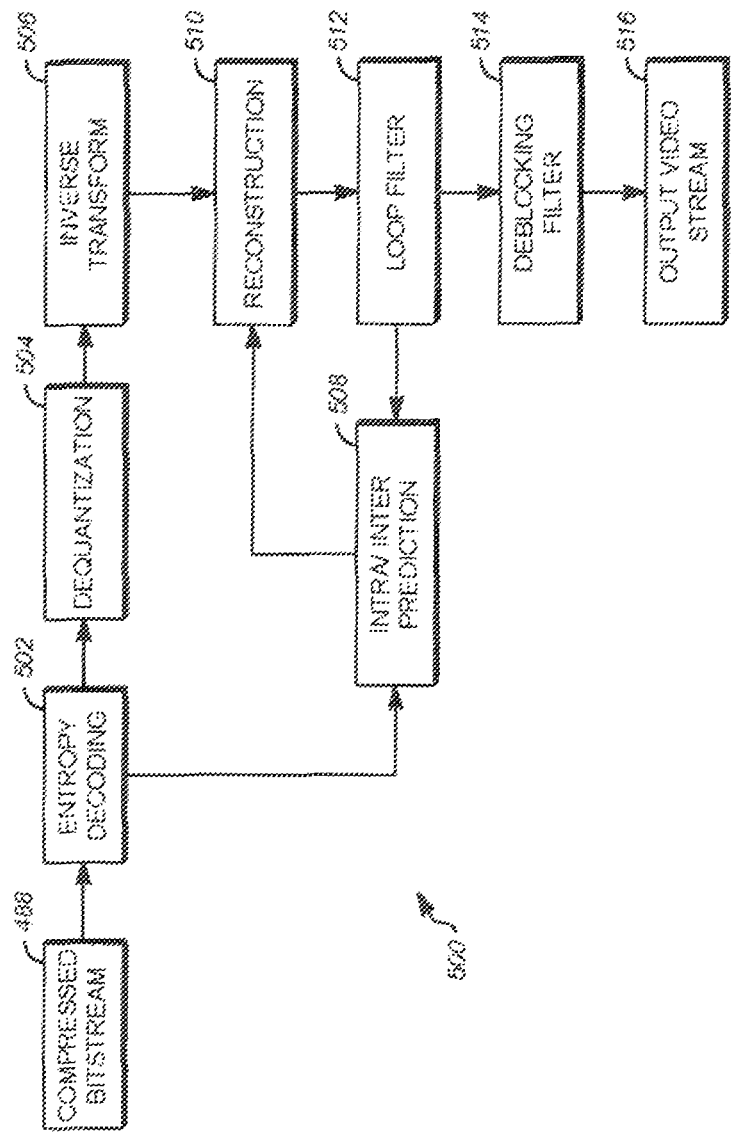
FIG. 5 is a block diagram of a video decompression system in accordance with another aspect of this disclosure.

FIG. 5 is a block diagram of a decoder 500 in accordance with implementations of this disclosure. Decoder 500 can be implemented, for example, in receiving station 130, such as by providing a computer software program stored in memory 226 for example. The computer software program can include machine instructions that, when executed by CPU 224, cause receiving station 130 to decode video data in the manner described in FIG. 5. Decoder 500 can also be implemented in hardware or firmware included, for example, in transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by reconstruction stage 484 in encoder 470. Using header information decoded from compressed bitstream 488, decoder 500 can use intra/inter prediction stage 508 to create the same prediction block as was created in encoder 470, e.g., at intra/inter prediction stage 472. In the case of inter prediction, the reference frame from which the prediction block is generated may be transmitted in the bitstream or constructed by the decoder using information contained within the bitstream.

At reconstruction stage 510, the prediction block can be added to the derivative residual to create a reconstructed block that can be identical to the block created by reconstruction stage 484 in encoder 470. In some implementations, loop filtering stage 512 can be applied to the reconstructed block to reduce blocking artifacts. A post-processing stage can be applied to the reconstructed block to further refine the image. In this example, deblocking filtering stage 514 can be applied to the reconstructed block to reduce blocking distortion, and the result is output as output video stream 516. Output video stream 516 can also be referred to as a decoded video stream and the terms are used interchangeably herein.

Other variations of decoder 500 can be used to decode compressed bitstream 488. For example, decoder 500 can produce output video stream 516 without post-processing such as deblocking filtering stage 514.

Figure 6:
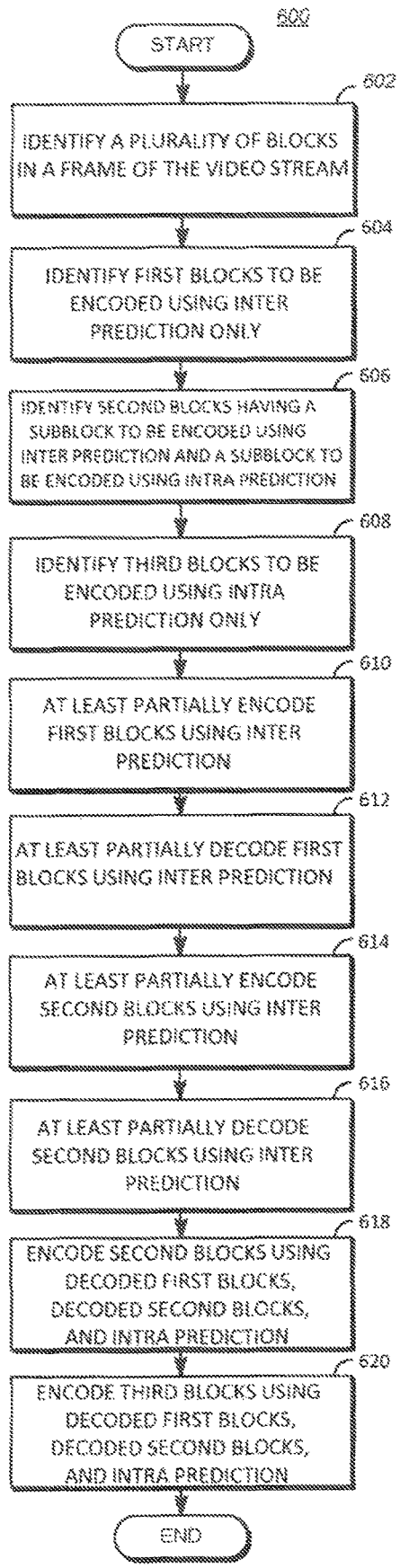
FIG. 6 is a flowchart of a process for encoding a video stream according to an aspect of this disclosure.

FIG. 6 is a flowchart of a process 600 for encoding a video stream according to an aspect of this disclosure. In this example, the video stream encodes blocks using inter-frame prediction first, then encodes blocks having at least one sub-block encoded using inter-frame prediction and at least one sub-block encoded using intra-frame prediction second, and then encodes blocks using intra-frame prediction last. Process 600 can be implemented in an encoder such as encoder 470 to implement prediction mode block ordering to encode a video stream. Process 600 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 600.

Process 600 can be implemented using specialized hardware or firmware. Some computing devices can have multiple memories, multiple processors, or both. The operations of process 600 can be distributed using different processors, memories, or both. Use of the terms "processor" and "memory" in the singular herein encompasses computing devices that have only one processor or one memory as well as devices having multiple processors or memories that can be used in the performance of some or all of the recited operations. However, operations in accordance with this disclosure can occur in various orders and/or concurrently. Additionally, operations in accordance with this disclosure can occur with other operations not presented and described herein. Furthermore, not all illustrated operations may be required to implement a method in accordance with the disclosed subject matter.

Process 600 assumes that a stream of video data having multiple frames, each having multiple blocks, is being encoded using a video encoder such as video encoder 470 executing on a computing device such as transmitting station 112. The video data or stream can be received by the computing device in any number of ways, such as by receiving the video data over a network, over a cable, or by reading the video data from a primary memory or other storage device, including a disk drive or removable media such as a Compact Flash (CF) card, Secure Digital (SD) card, or any other device capable of communicating video data. In some implementations, video data can be received from a video camera connected to the computing device operating the encoder.

At operation 602, a plurality of blocks, such as large 64×64 pixel blocks, are identified in a frame of the video stream. Identified can mean selected, chosen, determined or otherwise identified in any manner whatsoever. Any of the blocks of the plurality of blocks may be further partitioned and recursively split into smaller sub-blocks. When a block is partitioned into a smaller group of blocks, the processing order is first based on depth, such that the smaller, lower level blocks are processed and completed before processing the larger, higher level blocks. Blocks at each level are processed in scan order, based on depth from the lowest level to the highest level, processing smaller sub-blocks within a large block before the large block at the next level. At frame level, large blocks may still use raster scan order, where the blocks at each level are arranged in a rectangular array of rows and columns and the blocks of the array are accessed one at a time starting from the upper left hand corner and accessed in row order from the top row and moving down, for better cache efficiency.

At operation 604, a first group of blocks is identified, from the plurality of blocks, that are to be encoded using inter prediction. As described above and in relation to FIGS. 4 and 5, inter prediction includes using pixel data from another frame to predict the pixel data in a block. In one example of implementing the teachings herein, the first group of blocks is identified by examining blocks in the frame based on depth from the lowest level to the highest level in the scan order of the frame. Each block to be encoded using inter prediction and each block that comprises a plurality of sub-blocks wherein each sub-block is to be encoded using inter prediction is added to the first group of blocks.

At operation 606, a second group of blocks is identified from the plurality of blocks. The second group of blocks can be identified in the frame based on depth from the lowest level to the highest level in the same scan order of the blocks in the first group. That is, when examining the blocks in the frame in the scan order of the frame, each block that comprises a plurality of sub-blocks having at least one sub-block that is to be encoded using inter prediction and at least one sub-block that is to be encoded using intra prediction is added to the second group of blocks.

At operation 608, a third group of blocks is identified, from the plurality of blocks, that are to be encoded using intra prediction. The third group of blocks can be identified in the frame based on depth from the lowest level to the highest level in the same scan order of the blocks as the first group. That is, when examining the blocks in the frame in the scan order of the frame, each block to be encoded using intra prediction and each block that comprises a plurality of sub-blocks wherein each sub-block is to be encoded using intra prediction is added to the third group of blocks. Accordingly, operations 604, 606, and 608 may be performed during a single scan of the blocks of the frame by analyzing the blocks in the scan order for the optimal prediction mode and sorting the blocks into groups once that optimal prediction mode is selected.

Which prediction mode to use for a block can be determined by trying different prediction modes and comparing the results. For example, the sum of absolute differences for the resulting residual blocks for the various prediction modes can be compared. The prediction mode with the smallest rate-distortion cost can be selected for a given block. Note that although inter prediction is described generally as using block(s) of another frame to predict a block of the current frame, this disclosure contemplates that a current block may be encoded using inter prediction within the current frame through the use of a motion vector and another block within the current frame. Such a block would be included within the first group of blocks when the block is not further partitioned or when the block comprises a plurality of sub-blocks wherein each sub-block is to be encoded using inter prediction. The intra prediction modes tested as part of the identification operations 604, 606, and 608 can be restricted to those conventionally used with the scan order of the frame.

At next operation 610, the first group of blocks is at least partially encoded. Generally, this partial encoding is lossy, meaning that reversing the encoding operations will not result in exactly the same pixel values as input. As shown in FIG. 4, for example, encoding a block of video data can include forming a prediction block, in this case from another frame or the current frame using motion vector(s), subtracting the prediction block from the block to be encoded, transforming the block using a transform as described above and then quantizing the transform data. The encoding of the first group of blocks can occur in the scan order, based on depth from the lowest level to the highest level, skipping those blocks belonging to the second group of blocks and the third group of blocks. The partially-encoded blocks from the first group of blocks may also be referred to as encoded blocks.

At operation 612, the encoded blocks generated by the first group of blocks are partially decoded by reversing the lossy operations in encoding. In this example, this involves de-quantizing, inverse transforming and adding the inverse transformed block to the prediction block generated using inter prediction as described with reference to the reconstruction loop of FIG. 4. This yields pixel data that is equal to the pixel data formed when decoding the blocks at the decoder. An encoder can maintain a copy of the partially-encoded blocks in memory, for example, while performing the remaining operations in process 600 before completing the encoding of the blocks to include in the output video bitstream.

At next operation 614, after the first group of blocks are encoded, at least one sub-block to be encoded using inter prediction from the second group of blocks is at least partially encoded. Similarly as described above in relation to the first group of blocks, the encoding of the second group of blocks can occur in the scan order, based on depth from the lowest level to the highest level, skipping the sub-blocks belonging from the second group of blocks that are to be encoded using intra prediction and the blocks belonging to third group of blocks. The partially-encoded blocks from the second group of blocks may also be referred to as encoded blocks.

At operation 616, the inter predicted encoded blocks generated by the second group of blocks are partially decoded by reversing the lossy operations in encoding. Similarly as described above in relation to the first group of blocks, this yields pixel data that is equal to the pixel data formed when decoding the blocks at the decoder. An encoder can maintain a copy of the partially-encoded blocks in memory, for example, while performing the remaining operations in process 600 before completing the encoding of the blocks to include in the output video bitstream.

At operation 618, after the first group of blocks are encoded, at least one block from the second group of blocks is encoded using intra prediction and at least one of the partially encoded and decoded first group of blocks or at least one of the partially encoded and decoded sub-blocks using inter prediction from the second group of blocks. Intra prediction uses pixels from blocks peripheral to a block to predict the pixel values within a current block. This process may be performed in the scan order, based on depth from the lowest level to the highest level, after some or all blocks in the first group of blocks or second group of blocks to be encoded using inter prediction are encoded and decoded. As mentioned above, having encoded and decoded results from inter predicted blocks can improve the performance of intra prediction coded blocks by permitting additional prediction modes to be included in the encoding process. Accordingly, operation 618 can include re-calculating the optimal intra prediction mode choice for each block to be encoded using intra prediction. Some of these intra prediction modes may use information from inter coded blocks that would have been coded after a current block if all blocks were encoded in the scan order based on depth from the lowest level to the highest level, or in an alternative implementation, in a predefined coding order. As a result, intra coding of the current block can make use of reconstructed pixel values from inter coded blocks that would have been previously encoded after the current block as the inter coded blocks are already processed. The availability of these reconstructed pixel values may help improve the prediction quality when using intra prediction modes, therefore improving the overall coding efficiency of the video frame.

At operation 620, after the first group of blocks and the second group of blocks are encoded, the third group of blocks is encoded using intra prediction and at least one of the partially encoded and decoded first group of blocks or at least one of the partially encoded and decoded sub-blocks using inter prediction from the second group of blocks. As mentioned above, this process may be performed in the scan order, based on depth from the lowest level to the highest level, after some or all blocks in the first group of blocks or second group of blocks are encoded and decoded.

By dividing the blocks of the current frame to be encoded into three groups of blocks, the first group including blocks to be encoded using inter prediction and blocks having sub-blocks wherein each sub-block is to be encoded using inter prediction, the second group including blocks having at least one sub-block to be encoded using inter prediction and at least one sub-block to be encoded using intra prediction, and the third group including blocks to be encoded using intra prediction and blocks having sub-blocks wherein each sub-block is to be encoded using intra prediction, the order of encoding the blocks can be manipulated to provide better prediction for intra coded blocks, and hence improving coding efficiency. The order of encoding blocks is manipulated by process 600 to encode the first group of blocks before the second group of blocks and to encode the second group of blocks before the third group of blocks.

More particularly, and as described above in relation to FIGS. 4 and 5, intra prediction includes using pixel data from blocks peripheral to the block to be encoded to predict the pixel values in the block. The blocks used to form the prediction block are often encoded and decoded before being used for prediction. That is, since encoding and decoding can be lossy operations, the pixel values in the encoded and decoded block will not be exactly equal to the pixel values of the original block. By encoding and decoding the block before using it as a prediction block to predict another block, the encoder can use the same pixel values that a decoder will use to intra predict the same block. In the case of coding in raster scan order, for example, intra prediction often uses only pixels from above and to the left of the current block to form the prediction block. This arrangement guarantees that the pixel data of the blocks occurring before the block to be predicted will have been at least partially encoded and decoded before being used for prediction.

According to the teachings herein, the encoder can encode the first set of blocks first. These inter predicted blocks from the first set of blocks can then be decoded to form reconstructed, or decoded, blocks that can be used for intra prediction of blocks to be encoded using intra prediction in the second set of blocks and for intra prediction of the third set of blocks. Similarly, the encoder can encode the blocks using inter prediction from the second set of blocks second. These inter predicted blocks from the second group of blocks can then be decoded to form reconstructed, or decoded, blocks that can be used for intra prediction of blocks to be encoded using intra prediction in the second set of blocks and for intra prediction of the third set of blocks. In this way, the intra prediction modes for those blocks in the second set of blocks and the third set of blocks can be expanded to include intra prediction modes using blocks in any position relative to the current blocks where at least some of the blocks (i.e., earlier intra coded blocks in the scan order and the inter coded blocks) have already been encoded and decoded for prediction.

Figure 8:
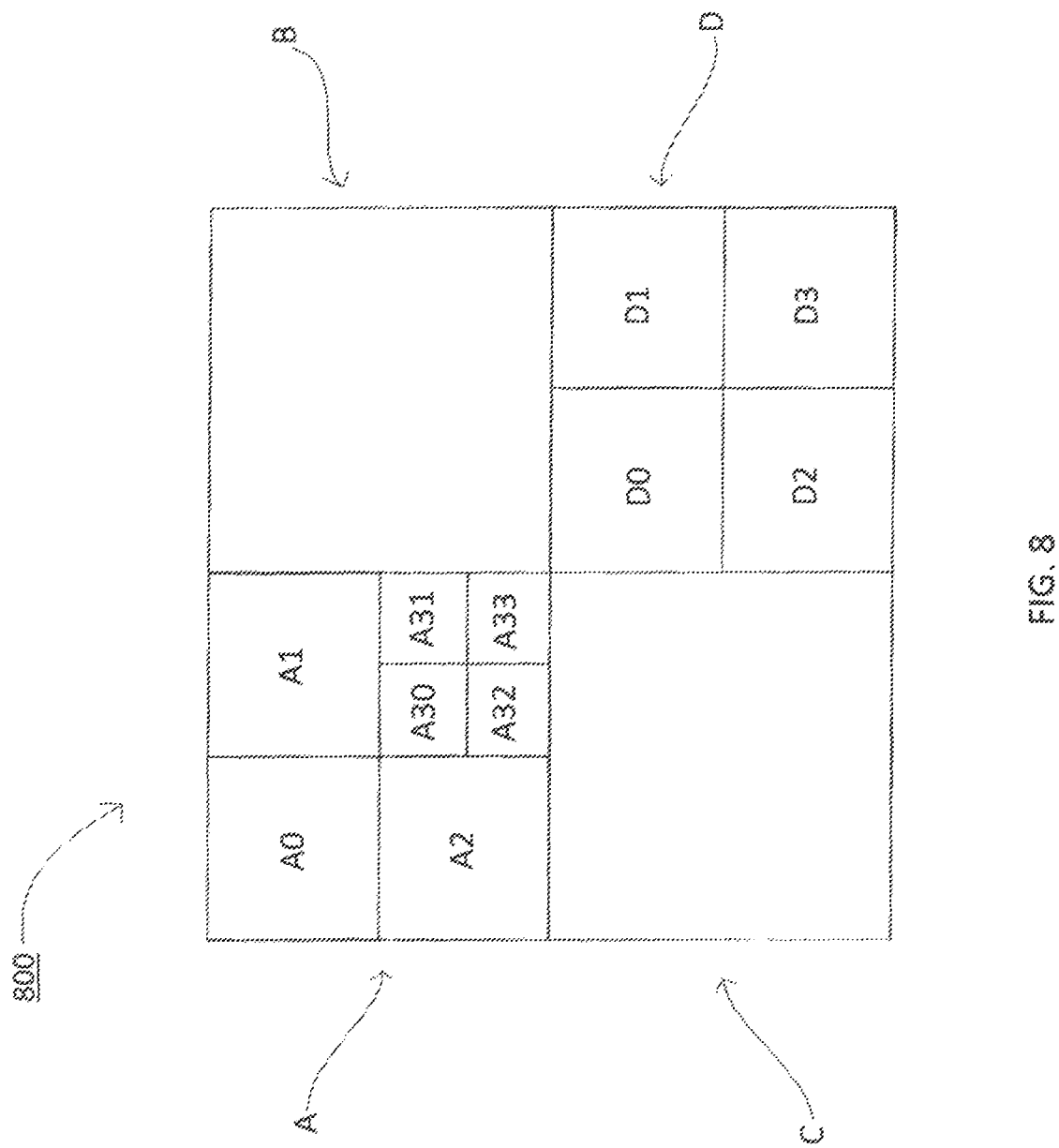
FIG. 8 is a diagram of recursively partitioned blocks to be encoded or decoded according to aspects of this disclosure.

FIG. 8 can be used to explain this process. FIG. 8 is a diagram of blocks in a frame 800 to be encoded or decoded according to aspects of this disclosure. In this example, frame 800 represents a 64×64 pixel block that is partitioned into four 32×32 pixel blocks A, B, C, and D. Block A is further partitioned into four 16×16 pixel blocks A0, A1, A2, and A3. Block A3 is further partitioned into four 4×4 pixel blocks A30, A31, A32, and A33. The encoder 470 processes each of the blocks to choose a prediction mode for each block. Each of the blocks, large or small, can use intra prediction or inter prediction in the encoding process. The encoder 470 processes each block based on depth, from the lowest level to the highest level, in scan order such that blocks A30, A31, A32, and A33 are processed first, followed by blocks A0, A1, A2, and A3, followed by blocks A, B, C, and D.

The encoder 470 orders each of the blocks based on the prediction mode used in encoding and decoding the blocks, processing the smaller sub-blocks at each level within a large block prior to processing the larger blocks. The encoder 470 classifies the blocks into three groups. The first group of blocks includes blocks to be encoded using inter prediction and blocks that are recursively split into sub-blocks wherein each sub-block is to be encoded using inter prediction. The second group of blocks includes blocks that are recursively split into sub-blocks wherein at least one sub-block of the block is to be encoded using inter prediction and at least one sub-block of the block is to be encoded using intra prediction. The third group of blocks includes blocks to be encoded using intra prediction and blocks that are recursively split into sub-blocks wherein each sub-block is to be encoded using intra prediction. For illustration purposes to explain the process of FIG. 6, blocks A0, A32, and C of FIG. 8 are determined to be encoding using intra prediction while the rest of the blocks are determined to be encoded using inter prediction. In this example, at the 4×4 pixel level, the first group of blocks includes blocks A30, A31, and A33 and the second group of blocks includes block A32. At the 16×16 pixel level, the first group of blocks includes blocks A1 and A2, the second group of blocks includes block A3, and the third group of blocks includes block A0. At the 32×32 pixel level, the first group of blocks includes blocks B and D, the second group of blocks includes block A, and the third group of blocks includes block C.

The blocks are processed and encoded according to the group classification at each level using the prediction mode determined for each block, where the first group of blocks are processed first, the second group of blocks processed second, and third group of blocks are processed last, with the levels processed in terms of decreasing depth from the lowest level to the highest level. Intra predicted blocks may use reconstructed pixel values from inter predicted blocks. In the example shown in FIG. 8, the 4×4 pixel level blocks are processed and encoded in the order of block A30, A31, A33, and A32, the 16×16 pixel level blocks are processed and encoded in the order of A1, A2, A3, and A0, and the 32×32 pixel level blocks are processed and encoded in the order of B, D, A, and C. The entropy coded, quantized residual blocks can then be packetized into a video bitstream for transmission or storage and subsequent decoding. The prediction modes can also be entropy encoded and included as part of the compressed data. No order definition needs to be encoded or transmitted.

Figure 7:
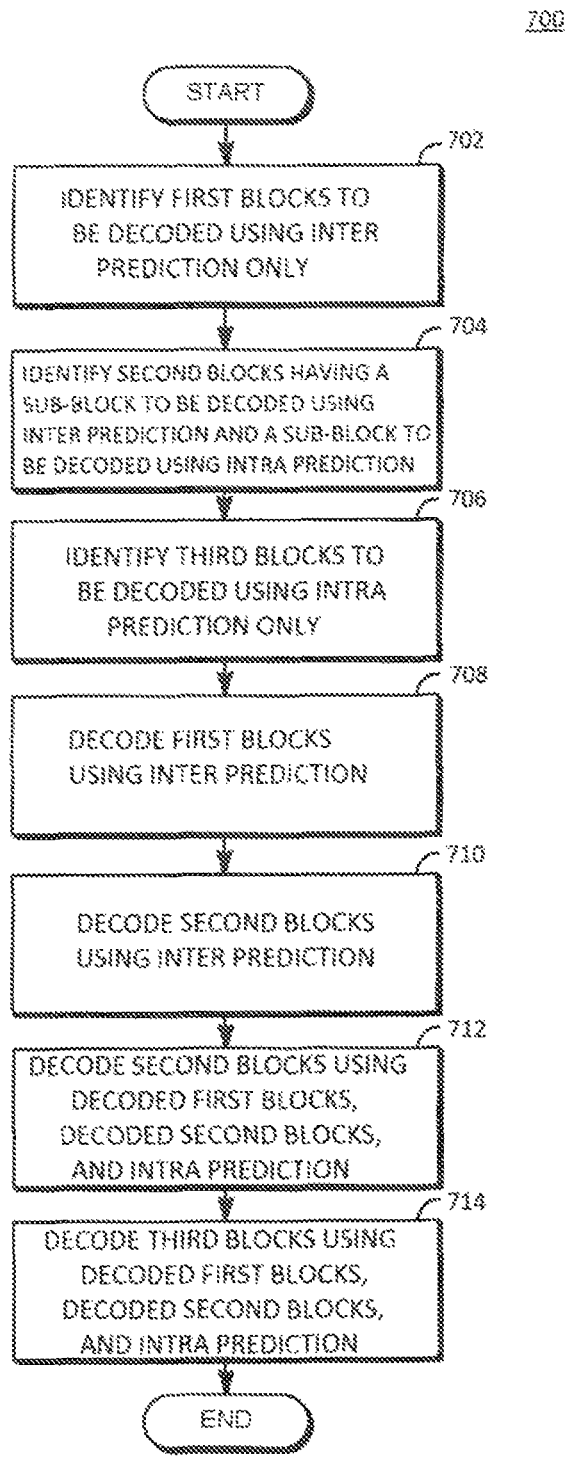
FIG. 7 is a flowchart of a process for decoding a video stream according to another aspect of this disclosure.

FIG. 7 is a flowchart of a process 700 for decoding a video bitstream according to another aspect of this disclosure. Broadly, in process 700, the first group of blocks of the video bitstream are decoded using inter prediction, the second group of blocks of the video bitstream are decoded using inter prediction or intra prediction, and then the third group of blocks are decoded using intra prediction. Process 700 can be implemented in a decoder such as decoder 500 according to aspects of disclosed implementations. Process 700 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware. As explained above, some computing devices may have multiple memories and multiple processors, and the operations of process 700 may in such cases be distributed using different processors and memories.

For simplicity of explanation, process 700 is depicted and described as a series of operations. However, operations in accordance with this disclosure can occur in various orders and/or concurrently. Additionally, operations in accordance with this disclosure may occur with other operations not presented and described herein. Furthermore, not all illustrated operations may be required to implement a method in accordance with the disclosed subject matter.

At operation 702, process 700 identifies a first group of encoded blocks that can be decoded using inter prediction, the first group of encoded blocks comprising blocks that were encoded using inter prediction or blocks comprising a plurality of sub-blocks wherein each sub-block was encoded using inter prediction. At operation 704, process 700 identifies a second group of encoded blocks that can be decoded using inter prediction or intra prediction, the second group of encoded blocks comprising blocks having a plurality of sub-blocks wherein at least one sub-block was encoded using inter prediction and at least one sub-block was encoded using intra prediction. At operation 706, process 700 identifies a third group of encoded blocks that can be decoded using intra prediction, the third group of encoded blocks comprising blocks that were encoded using intra prediction or blocks comprising a plurality of sub-blocks wherein each sub-block was encoded using intra prediction. As discussed above in relation to FIG. 6, the blocks of the frame can be identified in a scan order, based on depth from the lowest level to the highest level, which, for example, can be raster scan order. In this example, the decoder can perform entropy decoding to produce prediction modes for every block. All blocks are then grouped into three groups according to the prediction mode used. Accordingly, operations 702, 704, and 706 may be performed as one operation.

The blocks that can be decoded using each prediction method can be identified using bits included in the video bitstream by the encoder at the time the blocks were encoded, for example. These bits are included in the encoded video bitstream by an encoder to direct a decoder as to which prediction mode to use. As a result, blocks can be sorted into groups for decoding without requiring additional bits in the video bitstream beyond the bits typically included to identify the prediction mode.

At operation 708, the first group of blocks is decoded using inter prediction. For example, each entropy decoded residual block is inverse transformed and dequantized to form a residual block. The decoder generates the prediction block for the current block using inter prediction, and the current block is reconstructed by adding the prediction block to the residual block as described with respect to FIG. 5. The first group of blocks can be decoded in the scan order for the frame, e.g., raster scan order, based on depth from the lowest level to the highest level.

At operation 710, at least one block from the second group of encoded blocks is decoded using inter prediction, where the at least one block from the second group of encoded blocks was encoded using inter prediction. As described in relation to operation 708, each entropy decoded residual block is inverse transformed and dequantized to form a residual block. The decoder generates the prediction block for the current block using inter prediction, and the current block is reconstructed by adding the prediction block to the residual block as described with respect to FIG. 5. The at least one block from the second group of encoded blocks in operation 710 can be decoded in the scan order for the frame, e.g., raster scan order, based on depth from the lowest level to the highest level.

At operation 712, at least one block from the second group of encoded blocks, where the at least one block from the second group of encoded blocks was encoded using intra prediction, is decoded using intra prediction and, depending on the intra prediction mode, the blocks decoded using inter prediction from the first group of blocks and the second group of blocks. For example, each entropy decoded residual block is inverse transformed and dequantized to form a residual block. The decoder generates the prediction block for the current block using intra prediction, and the current block is reconstructed by adding the prediction block to the residual block as described with respect to FIG. 5. The at least one block from the second group of encoded blocks in operation 712 can be decoded in the scan order for the frame, e.g., raster scan order, based on depth from the lowest level to the highest level.

At operation 714, the third group of encoded blocks is decoded using intra prediction and, depending on the intra prediction mode, the blocks decoded using inter prediction from the first group of blocks and the second group of blocks. For example, each entropy decoded residual block is inverse transformed and dequantized to form a residual block. The decoder generates the prediction block for the current block using intra prediction, and the current block is reconstructed by adding the prediction block to the residual block as described with respect to FIG. 5. The third group of encoded blocks can be decoded in the scan order for the frame, e.g., raster scan order, based on depth from the lowest level to the highest level.

In this example, the processing of the blocks is performed according to the depth of the blocks, from the lowest level to the highest level with smaller sub-blocks at each level processed prior to the larger block at the next level, and the order classification described with respect to the encoder, processing the first group of blocks that includes blocks encoded using inter prediction and recursively split blocks having each sub-block of the block encoded using inter prediction first, then processing the second group of blocks that includes recursively split blocks having at least one sub-block of the block encoded using inter prediction and at least one sub-block of the block encoded using intra prediction, and then processing the third group of blocks that includes blocks encoded using intra prediction and recursively split blocks having each sub-block of the block encoded using intra prediction last. In other cases, processing of the blocks may be according to another predefined scan order, and the choice of such order may be encoded, so that the decoder can process the blocks in same order. No order definition, other than a predefined scan order, needs to be encoded or transmitted.

According to the teachings herein, intra predicted blocks may use reconstructed pixel values from inter predicted blocks even when those inter predicted blocks would have been encoded/decoded after them in the normal scan order. By re-ordering the encoding and decoding of blocks based on their prediction modes, the encoder can effectively change the data dependency of the blocks in the encoding/decoding process. The blocks encoded later in a frame can, in this way, use all reconstructed pixel information from previously encoded blocks for improving the quality of prediction, therefore improve the coding efficiency.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream, comprising:
    recursively partitioning, into sub-blocks, a block of a frame of the video stream,
        the sub-blocks forming levels of sub-blocks, such that a sub-block at one level comprises lower-level sub-blocks, and
        each sub-block predicted using either inter prediction or intra prediction;
    at a level of the sub-blocks, assigning each of the sub-blocks into a first group of sub-blocks, a second group of sub-blocks, or a third group of sub-blocks, wherein:
        the first group of sub-blocks consists of first sub-blocks of the sub-blocks, each first sub-block to be encoded using inter prediction or formed of lower-level sub-blocks each to be encoded using inter prediction,
        the second group of sub-blocks consists of second sub-blocks of the sub-blocks, each second sub-block comprising a first lower-level sub-block to be encoded using inter prediction and a second lower-level sub-block to be encoded using intra prediction, and
        the third group of sub-blocks consists of third sub-blocks of the sub-blocks, each third sub-block to be encoded using intra prediction or formed of lower-level sub-blocks each to be encoded using intra prediction; and
    encoding, in a scan order, the first group of sub-blocks, the second group of sub-blocks, and the third group of sub-blocks, by:
        at least partially encoding, using a processor performing inter prediction, the first group of sub-blocks in the scan order, while skipping sub-blocks belonging to the second group of sub-blocks and the third group of sub-blocks, to form a first group of encoded sub-blocks;
        at least partially decoding, using the processor, the first group of encoded sub-blocks to form a first group of decoded sub-blocks;
        at least partially encoding, using the processor performing inter prediction, a first sub-group of the second group of sub-blocks in the scan order, while skipping sub-blocks belonging to the second group of sub-blocks that are to be encoded using intra prediction and the third group of sub-blocks and after partially encoding the first group of sub-blocks, to form a second group of inter predicted encoded sub-blocks;
        at least partially decoding, using the processor, the second group of inter predicted encoded sub-blocks to form a second group of inter predicted decoded sub-blocks;
        encoding, using intra prediction, at least one block from the second group of sub-blocks, after partially encoding the first group of sub-blocks, using at least one sub-block from at least one of the first group of decoded sub-blocks or the second group of inter predicted decoded sub-blocks to form a second group of intra predicted encoded sub-blocks; and
        inserting the first group of encoded sub-blocks, the second group of inter predicted encoded sub-blocks, and the second group of intra predicted encoded sub-blocks into an encoded bitstream.

2. The method of claim 1, wherein encoding, in the scan order, the first group of sub-blocks, the second group of sub-blocks, and the third group of sub-blocks further comprising:
    encoding, using intra prediction, the third group of sub-blocks in the scan order, after partially encoding the first group of sub-blocks and encoding the second group of sub-blocks, using at least one sub-block from at least one of the first group of decoded sub-blocks or the second group of inter predicted decoded sub-blocks to form a third group of encoded sub-blocks; and
    inserting the third group of encoded sub-blocks into the encoded bitstream.

3. The method of claim 1, further comprising:
    determining a prediction mode for a sub-block by:
        calculating, for the sub-block, a residual block for each of a plurality of prediction modes; and selecting the prediction mode based on the plurality of prediction modes resulting in the smallest rate-distortion cost.

4. The method of claim 2, wherein encoding the third group of sub-blocks comprises:
determining an optimal intra prediction mode for a current block of the third group of sub-blocks from a plurality of intra prediction modes, wherein at least one of the plurality of intra prediction modes uses pixels of the at least one block of the first group of decoded sub-blocks or at least one block of the second group of inter predicted decoded sub-blocks; and
encoding the current block of the third group of sub-blocks using the optimal intra prediction mode.

5. The method of claim 2, wherein the first group of sub-blocks are at least partially encoded before the second group of sub-blocks are at least partially encoded and the second group of sub-blocks are at least partially encoded before the third group of sub-blocks are encoded.

6. The method of claim 1, wherein encoding the second group of sub-blocks to be encoded using intra prediction comprises:
determining an optimal intra prediction mode for a current block to be encoded using intra prediction of the second group of sub-blocks from a plurality of intra prediction modes, wherein at least one of the plurality of intra prediction modes includes pixels of the at least one sub-block of the first group of decoded sub-blocks or at least one sub-block of the second group of inter predicted decoded sub-blocks; and
encoding the current block of the second group of sub-blocks using the optimal intra prediction mode.

7. A method for decoding a video stream, comprising:
entropy decoding respective prediction modes for blocks of a frame of the video stream;
assigning the blocks, based on the respective prediction modes used to predict the blocks, into a first group of encoded blocks, a second group of encoded blocks, or a third group of encoded blocks, wherein
at least some of the blocks are partitioned into levels of sub-blocks for prediction,
at a level of the sub-blocks for a block:
the first group consists of first sub-blocks, each first sub-block predicted using inter prediction or formed of lower-level sub-blocks each predicted using inter prediction,
the second group consists of second sub-blocks, each second sub-block comprising at least one lower-level sub-block predicted using inter prediction and at least one lower-level sub-block predicted using intra prediction, and
the third group consists of third sub-blocks, each third sub-block predicted using intra prediction or formed of lower-level sub-blocks each predicted using intra prediction; and
decoding, in a scan order, the first group, the second group, and then the third group by:
decoding, using a processor performing inter prediction, the first group of encoded blocks in the scan order, while skipping at least one of a second sub-block belonging to the second group or a third sub-block belonging to the third group, to form a first group of decoded blocks;
decoding, using the processor performing inter prediction, the at least one lower-level sub-block predicted using inter prediction of the second group of encoded blocks in the scan order, after decoding the first group of encoded blocks, to form a second group of inter predicted decoded blocks; and
decoding, using intra prediction, the at least one lower-level sub-block predicted using intra prediction of the second group of encoded blocks, after decoding the first group of encoded blocks, using at least one block from at least one of the first group of decoded blocks or the second group of inter predicted decoded blocks to form a second group of intra predicted decoded blocks.

8. The method of claim 7, wherein decoding, in the scan order, the first group, the second group, then the third group comprises:
decoding, using intra prediction, the third group of encoded blocks in the scan order, after decoding the first group of encoded blocks and the second group of encoded blocks, using at least one block from at least one of the first group of decoded blocks or at least one block from the second group of inter predicted decoded blocks to form a third group of decoded blocks.

9. The method of claim 8, further comprising:
entropy decoding the video stream to obtain a prediction mode for each block of a plurality of blocks of the frame; and
assigning blocks from the plurality of blocks to the third group of encoded blocks on a condition that at least one of the blocks was encoded using intra prediction or the blocks comprise a plurality of sub-blocks wherein each sub-block was encoded using intra prediction.

10. The method of claim 7, further comprising:
entropy decoding the video stream to obtain a prediction mode for each block of a plurality of blocks of the frame;
assigning blocks from the plurality of blocks to the first group of encoded blocks on a condition that at least one of the blocks was encoded using inter prediction or the blocks comprise a plurality of sub-blocks wherein each sub-block was encoded using inter prediction; and
assigning blocks from the plurality of blocks to the second group of encoded blocks on a condition that the blocks comprise a plurality of sub-blocks wherein at least one sub-block was encoded using inter prediction and at least one sub-block was encoded using intra prediction.

11. An apparatus for encoding a video stream, comprising:
a memory; and
a processor configured to execute instructions in memory to:
assign each sub-block of a partitioned block of a frame of the video stream into a first group of blocks, a second group of blocks, or a third group of blocks, at least one of the sub-blocks comprising lower-level sub-blocks,
the first group of blocks formed of at least one sub-block to be encoded using inter prediction or lower-level sub-blocks of a sub-block, each to be encoded using inter prediction,
the second group of blocks formed of at least one sub-block partitioned into at least a first lower-level block to be encoded using inter prediction and at least a second lower-level block to be encoded using intra prediction, and
the third group of blocks formed of at least one sub-block to be encoded using intra prediction; and
encode, in a scan order, the first group of blocks, the second group of blocks, and the third group of blocks by:

at least partially encoding, using inter prediction, the first group of blocks in the scan order to form a first group of encoded blocks while skipping at least one of a sub-block belonging to the second group of sub-blocks, or a sub-block belonging to the third group of sub-blocks;

at least partially decoding the first group of encoded blocks to form a first group of decoded blocks;

at least partially encoding, using inter prediction, the second group of blocks, after partially encoding the first group of blocks, to form a second group of inter predicted encoded blocks by encoding the at least the first lower-level block of the second group of blocks;

at least partially decoding the second group of inter predicted encoded blocks to form a second group of inter predicted decoded blocks;

encoding, using intra prediction, the at least the second lower-level block of the second group of blocks, after partially encoding the first group of blocks, using at least one block from at least one of the first group of decoded blocks or the second group of inter predicted decoded blocks to form a second group of intra predicted encoded blocks; and inserting the first group of encoded blocks, the second group of inter predicted encoded blocks, and the second group of intra predicted encoded blocks into an encoded bitstream.

12. The apparatus of claim 11, wherein the processor is configured to:
encode, using intra prediction, the third group of blocks, after partially encoding the first group of blocks and encoding the second group of blocks, using at least one block from at least one of the first group of decoded blocks or the second group of inter predicted decoded blocks to form a third group of encoded blocks; and
insert the third group of encoded blocks into the encoded bitstream.

13. The apparatus of claim 12, wherein the processor is configured to:
calculate residual values for one or more prediction modes for a block of the frame; and
assign the block to the third group of blocks on condition that the block having smallest rate-distortion cost when a prediction mode is an intra prediction mode.

14. The apparatus of claim 12, wherein the processor is configured to:
process a plurality of blocks of the frame in the scan order to determine a prediction mode for each block; and
assign blocks from the plurality of blocks to the third group of blocks on a condition that at least one of the blocks use intra prediction or the blocks comprise a plurality of sub-blocks wherein each sub-block uses intra prediction.

15. The apparatus of claim 12, wherein the processor is configured to at least partially encode the first group of blocks before the second group of blocks and at least partially encode the second group of blocks before encoding the third group of blocks.

16. The apparatus of claim 12, wherein the processor is configured to encode the third group of blocks by:
determining an optimal intra prediction mode for a current block of the third group of blocks from a plurality of intra prediction modes, wherein at least one of the plurality of intra prediction modes includes pixels of the at least one block of the first group of decoded blocks or at least one block of the second group of inter predicted decoded blocks; and
encoding the current block of the third group of blocks using the optimal intra prediction mode.

17. The apparatus of claim 11, wherein the processor is configured to:
calculate residual values for one or more prediction modes for a plurality of blocks of the frame;
assign blocks from the plurality of blocks to the first group of blocks as the blocks having a smallest rate-distortion cost when a prediction mode is an inter prediction mode; and
assign blocks from the plurality of blocks to the second group of blocks as the blocks comprising a plurality of sub-blocks, wherein at least one sub-block of the plurality of sub-blocks of each block has a smallest rate-distortion cost when a prediction mode is an inter prediction mode and at least one sub-block of the plurality of sub-blocks of each block has a smallest rate-distortion cost when a prediction mode is an intra prediction mode.

18. The apparatus of claim 11, wherein the processor is configured to:
process a plurality of blocks of the frame in a scan order to determine a prediction mode for each block;
assign blocks from the plurality of blocks to the first group of blocks on a condition that at least one of the blocks use inter prediction or the blocks comprise a plurality of sub-blocks wherein each sub-block uses inter prediction; and
assign blocks from the plurality of blocks to the second group of blocks on a condition that the blocks comprise a plurality of sub-blocks wherein at least one sub-block uses inter prediction and at least one sub-block uses intra prediction.

19. The apparatus of claim 11, wherein the processor is configured to encode the second group of blocks to be encoded using intra prediction by:
determining an optimal intra prediction mode for a current block to be encoded using intra prediction of the second group of blocks from a plurality of intra prediction modes, wherein at least one of the plurality of intra prediction modes includes pixels of the at least one block of the first group of decoded blocks or at least one block of the second group of inter predicted decoded blocks; and
encoding the current block of the second group of blocks using the optimal intra prediction mode.

* * * * *